US010755095B1

(12) United States Patent
Cunningham et al.

(10) Patent No.: US 10,755,095 B1
(45) Date of Patent: Aug. 25, 2020

(54) SYSTEM FOR SCANNING SOLICITATIONS FOR FRAUD DETECTION

(71) Applicant: Capital One Services, LLC, McLean, VA (US)

(72) Inventors: Sarah Cunningham, Arlington, VA (US); Adam Vukich, Alexandria, VA (US); George Bergeron, Falls Church, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/732,784

(22) Filed: Jan. 2, 2020

(51) Int. Cl.
*G06K 9/00* (2006.01)
*G06K 9/62* (2006.01)
*G06F 16/23* (2019.01)
*G06Q 10/10* (2012.01)
*G06Q 30/02* (2012.01)
*G06Q 30/00* (2012.01)
*G06N 20/00* (2019.01)
*H04L 29/06* (2006.01)

(52) U.S. Cl.
CPC ..... *G06K 9/00483* (2013.01); *G06F 16/2379* (2019.01); *G06K 9/6218* (2013.01); *G06K 9/6262* (2013.01); *G06N 20/00* (2019.01); *G06Q 10/107* (2013.01); *G06Q 30/0185* (2013.01); *G06Q 30/0279* (2013.01); *H04L 63/126* (2013.01); *G06K 2209/25* (2013.01)

(58) Field of Classification Search
CPC ............ G06K 9/00483; G06K 9/6218; G06K 9/6262; G06K 2209/25; G06K 19/06037; G06F 16/2379; G06N 20/00; G06Q 10/107; G06Q 30/0185; G06Q 30/0279; G06Q 30/02; G06Q 30/0601; G06Q 20/3276; G06Q 20/352; H04L 63/126; H04L 63/1483; H04L 63/1416; H04L 63/0236; H04L 67/14; H04L 51/12; H04L 51/22; H04L 63/1441
See application file for complete search history.

(56) References Cited

U.S. PATENT DOCUMENTS

| 8,634,066 | B1 | 1/2014 | Fraser |
| 8,744,196 | B2 | 6/2014 | Sharma et al. |
| 10,380,580 | B1* | 8/2019 | Seetharam ....... G06K 19/06037 |
| 2002/0091538 | A1* | 7/2002 | Schwartz ............... G06Q 30/02 705/329 |
| 2008/0172741 | A1* | 7/2008 | Reumann ............ H04L 63/1483 726/23 |

(Continued)

FOREIGN PATENT DOCUMENTS

WO 2001015382 A1 3/2001

*Primary Examiner* — Jianxun Yang
(74) *Attorney, Agent, or Firm* — Banner & Witcoff, Ltd.

(57) ABSTRACT

Aspects described herein may allow for scanning text and a logo image from a document including a solicitation to donate, comparing the scanned text to a database including legitimate and fraudulent solicitations; determining a scanned text confidence level, based on a likelihood that the scanned text is a legitimate solicitation for donations; comparing the scanned logo to a known legitimate logo, determining a logo confidence level based on a likelihood that the scanned logo a legitimate logo, and calculating a solicitation confidence level based on the scanned text confidence level and the logo confidence level.

16 Claims, 6 Drawing Sheets

(56) References Cited

U.S. PATENT DOCUMENTS

2010/0007930 A1    1/2010  Cowburn et al.
2018/0013789 A1*   1/2018  Damian .............. H04L 63/1416
2019/0075121 A1*   3/2019  Dutta ...................... H04L 67/14

* cited by examiner

SYSTEM FOR SCANNING SOLICITATIONS FOR FRAUD DETECTION

FIELD OF USE

Aspects of the disclosure relate generally to scanning solicitations for fraud detection. More specifically, aspects of the disclosure may provide for enhanced systems for scanning text and logos on solicitations from fundraising entities and providing a confidence level based on a likelihood that the solicitation is a legitimate solicitation.

BACKGROUND

Individuals often receive solicitations for donations from fundraising entities. Such solicitations may be printed solicitations received in the mail. Printed solicitations may also be handed to the individual by a representative or agent of a fundraising entity, such as when the individual is traveling. Other solicitations may be received as emails sent to the individual. Often times these solicitations for donations are designed to look like a legitimate request for funds from a known entity. In some cases, although the solicitation may look legitimate, the entity or organization requesting funds may not actually exist. Other solicitations may be requests for personal information of the individual. For example, a letter or email may purport to be from the IRS, requesting taxpayer information such as the individual's social security number and/or other personal information. Often times such solicitations are fraudulent and are not actually from the entity or organization listed in the solicitation, or are from a non-existent entity. Some fraudulent solicitations are easy to detect and reject based on the text in the solicitation, but others may not be so apparent. Solicitations may include logos of the entity, and fraudulent logos in a solicitation may be similar to the actual logo and not easily recognized.

Such fraudulent solicitations are often targeted to the elderly, and this target group may be less likely to be able to detect when a solicitation or request is fraudulent. The elderly may be less familiar with the logos of entities and the types of fraudulent solicitations that are often sent out.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-implemented method for evaluating whether a solicitation for funds or information is legitimate. In accordance with certain embodiments, a computer-implemented method may include receiving, from a user's scanning device, scanned OCR text and a scanned logo image from a document including a solicitation to donate to a fundraising entity; comparing, with a server device connected to the user's scanning device, the scanned OCR text to a database including legitimate solicitations for donations and fraudulent solicitations for donations; determining a scanned text confidence level, with the server device, based on a likelihood that the scanned text is a legitimate solicitation for donations; comparing, with the server device, the scanned logo to a known legitimate logos of the fundraising entity; determining a logo confidence level, with the server device, based on a likelihood that the scanned logo is the known legitimate logo of the fundraising entity; calculating, with the server device, a solicitation confidence level based on the scanned text confidence level and the logo confidence level; transmitting, from the server device to the user's scanning device, the solicitation confidence level; and displaying, on the user's scanning device, the solicitation confidence level.

In accordance with other aspects, a system may include an optical head mounted display configured to: scan a document including a solicitation to donate to a fundraising entity, the scan including applying OCR to text in the document and capturing a logo image in the document; and a server device connected to the optical head mounted display, the server device configured to: receive the scanned OCR text and captured logo from the optical head mounted display; access a text database of text from known fraudulent solicitation text phrases and legitimate solicitation text phrases; compare the scanned OCR text to the text from known fraudulent solicitation text phrases and legitimate solicitation text phrases; determine a text confidence level based on a likelihood that the scanned OCR text is a legitimate solicitation; access a logo database; compare the captured logo image to known legitimate fundraising entity logos from the logo database; determine a logo confidence level based on a likelihood that the captured logo image is a legitimate logo of the fundraising entity; produce a solicitation confidence level based on the text confidence level and the logo confidence level; and transmit, from the server device to the user's scanning device, the solicitation confidence level.

In accordance with further aspects, one or more non-transitory media storing instructions that, when executed by one or more processors, cause the one or more processors to perform steps including receiving, from a user's optical head mounted display, scanned data from a solicitation to donate to a fundraising entity, the data including text, a logo image, a URL, and an email address; comparing, with a server device, the scanned data to a database including legitimate solicitations for donations and fraudulent solicitations for donations, the database including known fraudulent solicitation text phrases, known legitimate solicitation text phrases, known legitimate logos of fundraising entities, known fraudulent logos of fundraising entities, known legitimate logos of fundraising entities, known fraudulent URLs of fundraising entities, known legitimate URLs of fundraising entities, known fraudulent email addresses of fundraising entities, and known legitimate email addresses of fundraising entities; determining, with the server device, a text confidence level based on a likelihood that the scanned text is a legitimate solicitation for donations; determining, with the server device, a logo confidence level based on a likelihood that the scanned logo is the known legitimate logo of a fundraising entity; determining, with the server device, a URL confidence level based on a likelihood that the scanned URL is the known legitimate URL of a fundraising entity; determining, with the server device, an email address confidence level based on a likelihood that the scanned email address is the known legitimate email address of a fundraising entity; calculating, with the server device, a solicitation confidence level based on the text confidence level, the logo confidence level, the URL confidence level, and the email address confidence level; transmitting, from the server device to the user's optical head mounted display, the solicitation confidence level; obtaining, from the user's optical head mounted display, feedback to determine whether the solicitation confidence level accurately predicted whether the solicitation was legitimate; and training a machine learning model based on a plurality of confidence levels, wherein the instructions cause the server device to train the machine learning model by causing the server device to: cluster confidence levels corresponding to each of the plurality of confidence levels into whether the solicitation was legitimate or fraudulent; determine one or more patterns of performance based on whether the text is a legitimate or fraudulent solicitation, whether the scanned logo is the legitimate logo of the fundraising entity, whether the scanned URL is the legitimate logo of the fundraising entity, and whether the scanned email address is legitimate email address of the fundraising entity, based on whether the confidence level accurately predicted whether the scanned text was legitimate, whether the scanned logo was legitimate, whether the scanned URL was legitimate, and whether the scanned email was legitimate; and update the machine learning model based on the determined patterns of performance.

By using computing devices and applications to detect fraudulent solicitations, individuals can avoid sending money or personal information to fraudulent entities, thereby saving money and protecting their personal information from being used for future fraudulent purposes.

Corresponding apparatus, systems, and computer-readable media are also within the scope of the disclosure. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer readable media for detecting fraud in solicitations for funds or information.

Before discussing these concepts in greater detail, however, several examples of a computing device that may be used in implementing and/or otherwise providing various aspects of the disclosure will first be discussed with respect to FIG. 1.

Figure 1:
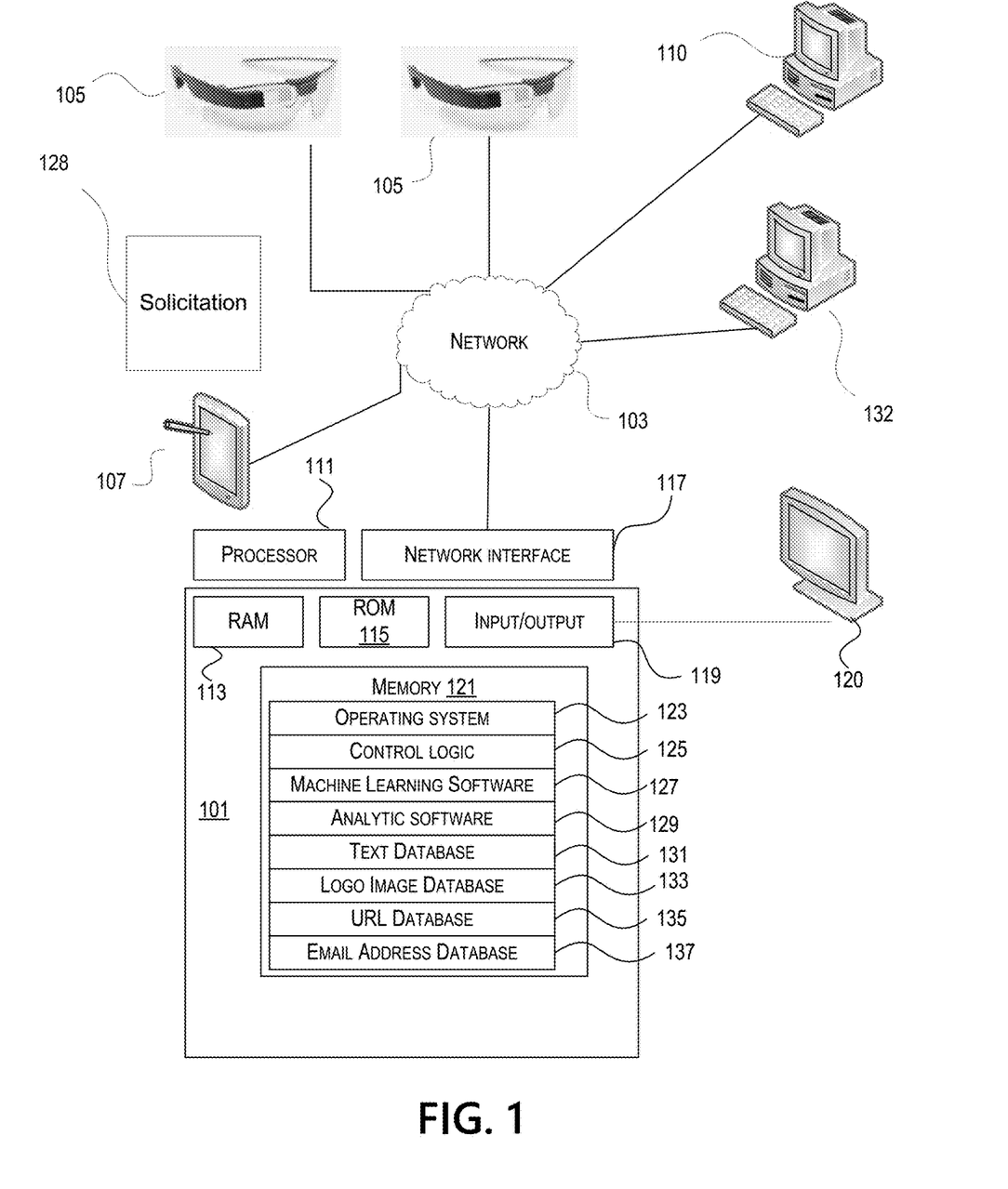
FIG. 1 depicts an example of a computing device that may be used in implementing one or more aspects of the disclosure in accordance with one or more illustrative aspects discussed herein.

FIG. 1 illustrates one example of a computing device 101, or server device, that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

A computing device 101 may, in some embodiments, operate in a standalone environment. In others, computing device 101 may operate in a networked environment. As shown in FIG. 1, various network nodes 101, 105, 107, 110, 132 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 110, 132 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations required by one or more applications stored on the computing device 101. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, analytic software 129, a text database 131, a logo image database 133, a URL database 135, and an email address database 137. Furthermore, memory 121 may store various other databases and applications depending on the particular use. Control logic 125 may be incorporated in and/or may comprise a linking engine that updates, receives, and/or associates various information stored in the memory 121. In other embodiments, computing device 101 may include two or more of any and/or all of these components (e.g., two or more processors, two or more memories, etc.) and/or other components and/or subsystems not illustrated here.

Devices 105, 107, 110, 132 may have similar or different architecture as described with respect to computing device 101. Those of skill in the art will appreciate that the functionality of computing device 101 (or device 105, 107, 110, 132) as described herein may be spread across multiple data processing devices, for example, to distribute processing load across multiple computers, to segregate transactions based on geographic location, user access level, quality of service (QoS), etc. For example, devices 101, 105, 107, 110, 132 and others may operate in concert to provide parallel computing features in support of the operation of control logic 125 and/or machine learning software 127 and/or analytic software 129.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an illustrative environment and network detecting fraudulent solicitations.

Embodiments discussed herein depict an example method for scanning a solicitation 128 received by a user. Solicitation 128 may be entirely text based, or may include a logo of the entity that has sent or delivered the solicitation. Solicitation 128 may be a printed document, and may be received by the user in the mail. In other embodiments, a printed solicitation 128 may be hand delivered to the user. For example, a solicitor may hand a printed solicitation for fundraising to the user while the user is traveling on vacation in another country. Such a solicitation may be a request to donate funds to a local organization of which the user has no knowledge. In other embodiments, solicitation 128 may be received by the user in electronic form, such as an email.

In certain embodiments, solicitation 128 may be a request to donate to a fundraising entity or organization. The fundraising entity may be one that is known to the user and may be a legitimate solicitation for funds by a legitimate fundraising entity. In other cases, solicitation 128 may appear that it is from an entity known by the user, but in reality may not actually be from that entity, and may merely be an attempt to steal funds from the user. At other times, the fundraising entity may not be known by the user, and, in fact, could be a non-existent entity attempting to steal funds from the user.

In other embodiments, solicitation 128 may be a request for personal information of the user. Solicitation 128 may purport to be from an entity or organization that the user has a business relationship with, such as a bank or credit card company, for example. In other cases, solicitation may purport to be from a government organization, such as the IRS. In such cases, solicitation 128 may request personal information of the user, such as their social security number, account numbers, address, etc. Such requests may be legitimate, or may be an attempt by an entity or individual to illegally access the user's personal information in an attempt to steal the user's identity or obtain access to accounts of the user.

Whether the solicitation is for funds or information, it would be advantageous for the user to be able to have a level of confidence that the request is legitimate, or that the request is fraudulent in order to help avoid sending money to a fraudulent or non-existent entity, and to avoid sending personal information to a fraudulent or non-existent entity.

One or more users may scan a solicitation 128 using a scanning device 105. In certain embodiments scanning device 105 may be an optical head mounted display. Exemplary head mounted displays include Google Glass. In other embodiments, scanning device 105 may be a stand-alone scanner, or a scanning component of an all-in-one scanner/printer/fax machine. Other suitable scanning devices will be readily apparent to those skilled in the art, given the benefit of this disclosure.

It is to be appreciated that in certain embodiments, scanning devices 105 of the users may be connected to server device 101 through network 103 by way of a separate device 107 or a separate device 110. Devices 107, 110 may be a personal computer, a laptop computer, a PDA, or any other suitable computing device. Server device 101 and scanning device 105 or devices 107, 110 may utilize application interfaces ("API's") in order to run applications to facilitate the exchange of information.

Scanning device 105 may scan the text of solicitation 128 using Optical Character Recognition ("OCR"), and may also scan a logo, or multiple logos, that are included in solicitation 128. The scanned OCR text and scanned logo image are sent to server device 101 for analysis of the text and logo.

Server device 101 may then use analytic software 129 to determine the likelihood that the scanned OCR text is a legitimate solicitation, for funds or information, and that the scanned logo is a legitimate logo of an entity, such as a fundraising entity. Additionally, analytic software 129 may determine the likelihood that the scanned OCR text is a fraudulent solicitation, for funds or information, and that the scanned logo is a fraudulent logo of a known entity, such as a fundraising entity or other organization.

In order to evaluate the likelihood that the scanned OCR text is a legitimate solicitation, analytic software 129 may compare the scanned OCR text to a text database 131 of known phrases used in solicitations. In certain embodiments, the known phrases could be commonly used strings of text known to be part of a fraudulent solicitation, such as "Nigerian Prince", for example. In other embodiments, the known phrases could be telephone numbers known to be affiliated with fraudulent solicitations, or telephone numbers known to be the legitimate phone number of a fundraising entity, for example.

The known phrases may include known legitimate solicitations for legitimate fundraising entities and known legitimate requests for information from legitimate organizations. For example, the solicitation may be a legitimate request from the American Red Cross, requesting funds to help with a natural disaster. The known phrases may also include known fraudulent solicitations for fundraising and information. For example, a well-known solicitation, often including the phrase "Nigerian Prince", purports to be from overseas royalty that are offering a share of a huge investment opportunity or a fortune that they can't get out of the country without help from the user. Such a solicitation may ask the user for their bank account number so they can transfer the money to the user for safekeeping, or for a small advance payment to help cover the expense of transferring the money. In either case, the user's money is taken, never to be returned.

By comparing phrases of the scanned OCR text to known phrases in text database 131, the analytic software 129 can determine a text confidence level based on a likelihood that the scanned text is a legitimate solicitation, either for funds or for information. The confidence level may be a percentage likelihood that the solicitation is legitimate, such as 70% or 90%, or it may be a number on a scale such as 0-10, or 0-100.

Text database 131 can be updated over time as the operators of server device 101 become aware of new known legitimate and known fraudulent solicitations, and/or known legitimate and fraudulent phrases used in solicitations.

In certain embodiments, text database 131 can be updated by interfacing with other organizations that track fraudulent solicitations for fundraising and/or information. Server device 101 may communicate through network 103 with a device 132 of an external organization that maintains its own database of known legitimate and known fraudulent solicitations, and/or known legitimate and known fraudulent phrases used in solicitations. Exemplary external organizations that may maintain their own database of known legitimate and known fraudulent solicitations, and/or known legitimate and known fraudulent phrases used in solicitations include the Federal Trade Commission ("FTC"), Consumer Financial Protection Bureau, Internet Crime Complaint Center ("IC3"), the State Department, U.S. Postal Inspection Service, Federal Communications Commission, State Attorney General offices, and local police departments.

By comparing phrases of the scanned OCR text to known phrases in text database 131, the analytic software 129 can determine a text confidence level based on a likelihood that the scanned text is a legitimate solicitation, either for funds or for information. The confidence level may be a percentage likelihood that the solicitation is legitimate, such as 70% or 90%, or it may a number on a scale, such as 0-10, or 0-100.

Similarly, analytic software 129 may be used to compare the scanned logo to known logos in a logo database 131. Logo database 131 may contain known legitimate logos of legitimate entities. The known legitimate logos of legitimate entities may or may not have been previously used in solicitations. Logo database 131 may also contain known illegitimate logos of legitimate entities. It is to be appreciated that some fraudulent solicitations may use an older logo of an entity, that is no longer used by the entity, in order to try and fool the user into believing that the solicitation is legitimate. Such older, inactive logos can be uploaded to logo database 131 and categorized as likely fraudulent logos.

In certain embodiments, logo database 131 can be updated by interfacing with other organizations that track the use of fraudulent logos in solicitations for fundraising and/or information. Server device 101 may communicate through network 103 with device 132 of an external organization that maintains its own database of known legitimate and known fraudulent logos. Exemplary external organizations that may maintain their own database of known legitimate and known fraudulent logos used in solicitations include the Federal Trade Commission ("FTC"), Consumer Financial Protection Bureau, Internet Crime Complaint Center ("IC3"), the State Department, U.S. Postal Inspection Service, Federal Communications Commission, State Attorney General offices, and local police departments.

In other embodiments, server device 101 could utilize web scraping to update logo database 131, by accessing the websites of fundraising entities and other entities that solicit funds and/or information from users.

In certain embodiments, server device 101 could maintain a cache of logo images in memory 121 for a predetermined length of time, and search the logo images in the cache when a scanned logo image is uploaded from a user's scanning device 105.

Figure 2:
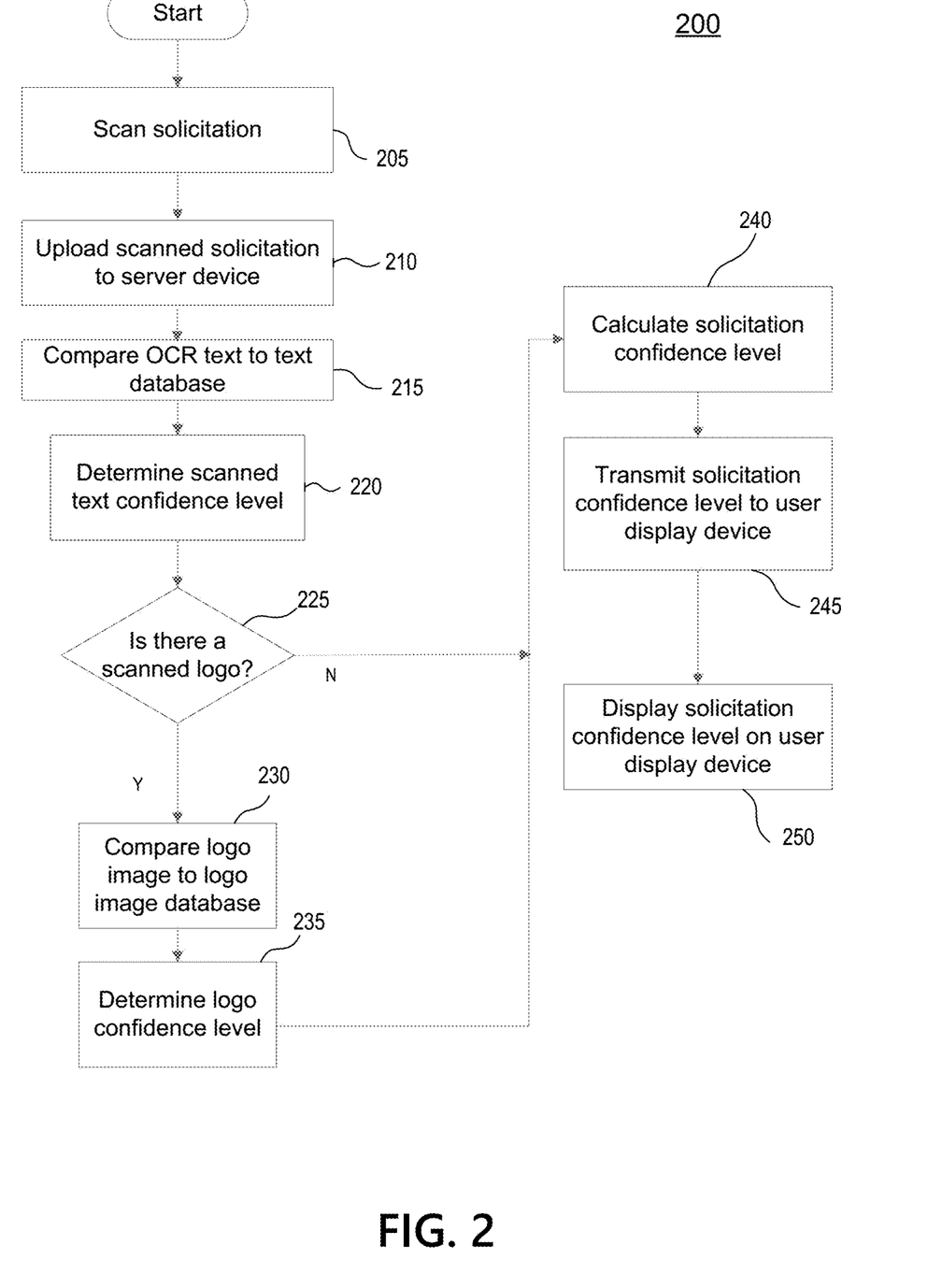
FIG. 2 depicts a flow diagram of an example method in accordance with one or more illustrative aspects discussed herein.

A method 200 of scanning a solicitation 128 is shown in FIG. 2. At step 205 of FIG. 2, a user scans a solicitation 128 with a scanning device 105. In embodiments where the solicitation is printed, step 205 may include using OCR to scan text of solicitation 128, and the scanning of any logos present in solicitation 128. At step 210, the scanned solicitation 128 is uploaded to server device 101. At step 215, the scanned OCR text is compared to text database 131 of server device 101 with analytic software 129. At step 220, server device 101 determines a scanned text confidence level based on a likelihood that the scanned text is a legitimate solicitation, for either donations or information.

At step 225, it is determined if a logo image had been scanned in at step 205. If it is determined that a logo image had been scanned in at step 205, the logo image is compared to logo image database 133 of server device 101 using analytic software 129 at step 230. At step 235, server device 101 determines a logo confidence level based on a likelihood that the scanned logo image is a known legitimate logo for a fundraising organization or other entity.

At step 240, the server device calculates a solicitation confidence level with analytic software 129 based on the scanned text confidence level and the logo confidence level. It is to be appreciated that in certain embodiments, the scanned text confidence level and the logo confidence level can contribute equally to the solicitation confidence level. In other embodiments, the scanned text confidence level and the logo confidence level can each be weighted in order to determine the solicitation confidence level. It is to be appreciated that the scanned text confidence level and the logo confidence level can each be weighted at any desired ratio.

If it is determined at step 225 that a logo image had not been scanned in at step 205, the server device calculates the solicitation level at step 240 using only the scanned text confidence level. At step 245, the confidence level is transmitted by server device 101 to the user's scanning device 105, and at step 250 the confidence level is displayed to the user on scanning device 105.

Figure 3:
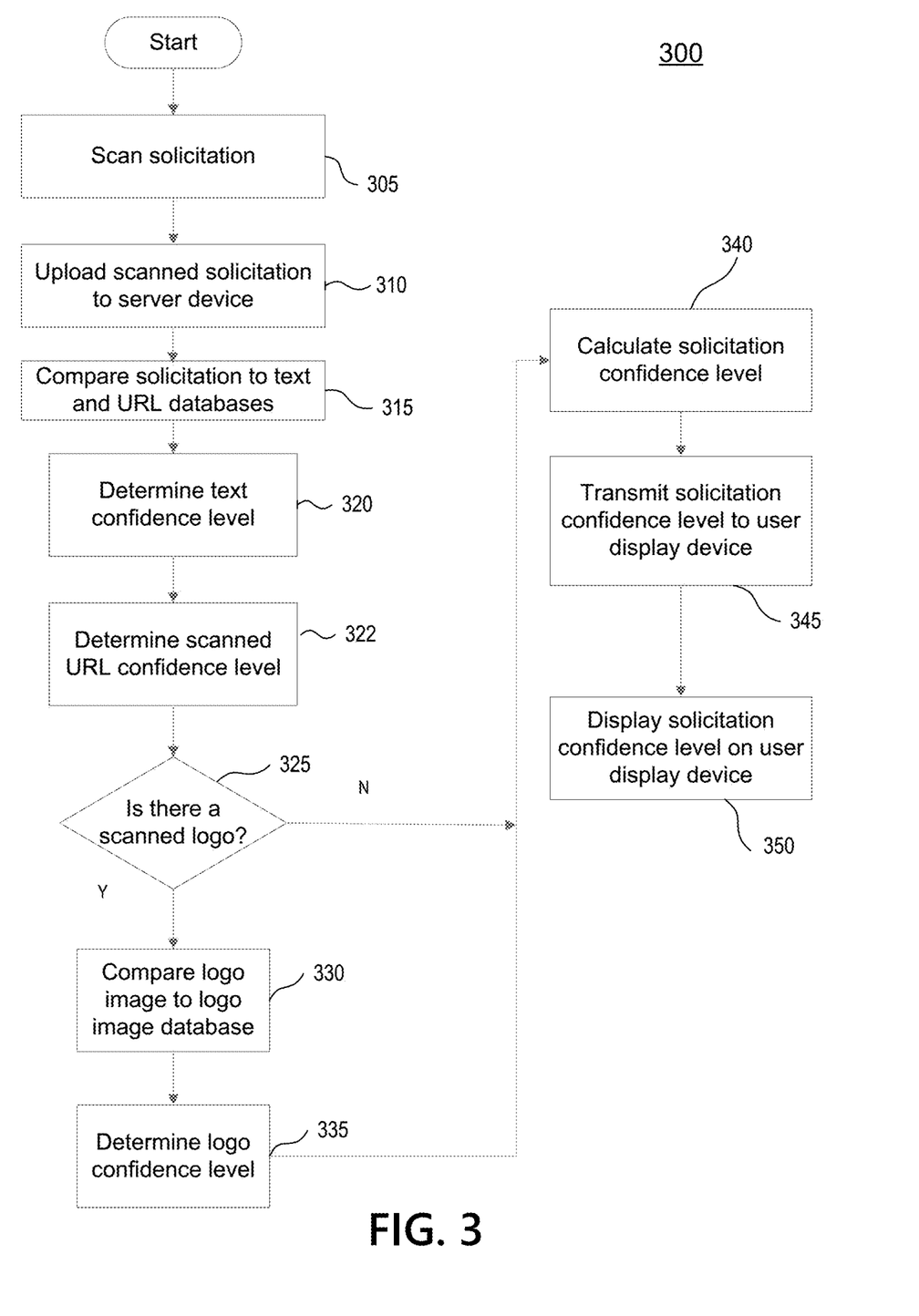
FIG. 3 depicts a flow diagram of an alternative example method in accordance with one or more illustrative aspects discussed herein.

An alternative method 300 of scanning a solicitation 128 is shown in FIG. 3. At step 305 of FIG. 3, a user scans a solicitation 128 with a scanning device 105. It is to be appreciated that in certain embodiments the solicitation may be electronic, such as an email. In embodiments where solicitation includes a link to website with a URL, step 305 includes using OCR to scan the URL as well as the text of the solicitation. At step 310, the scanned solicitation 128 is uploaded to server device 101. At step 315, the scanned text is compared to text database 131 and the scanned URL is compared to URL database 135 of server device 101 with analytic software 129. At step 320, server device 101 determines a scanned text confidence level based on a likelihood that the scanned text is a legitimate solicitation, for either donations or information. At step 322, server device 101 determines a scanned URL confidence level based on a likelihood that the scanned URL is a legitimate URL for a known legitimate entity that solicits for either donations or information.

At step 325, it is determined if a logo image had been scanned in at step 305. If it is determined that a logo image had been scanned in at step 305, the logo image is compared to logo image database 133 of server device 101 using analytic software 129 at step 330. At step 335, server device 101 determines a logo confidence level based on a likelihood that the scanned logo image is a known legitimate logo for a known legitimate fundraising organization or other entity.

At step 340, the server device calculates a solicitation confidence level with analytic software 129 based on the text confidence level, the URL confidence level, and the logo confidence level. It is to be appreciated that in certain embodiments, the text confidence level, the URL confidence level, and the logo confidence level can contribute equally to the solicitation confidence level. In other embodiments, the text confidence level, the URL confidence level, and the logo confidence level can each be weighted in order to determine the solicitation confidence level. It is to be appreciated that the text confidence level, the URL confidence level, and the logo confidence level can each be weighted at any desired ratio.

If it is determined at step 325 that a logo image had not been scanned in at step 305, the server device calculates the solicitation level at step 340 using only the text confidence level and the URL confidence level. At step 345, the confidence level is transmitted by server device 101 to the user's scanning device 105, and at step 350 the confidence level is displayed to the user on scanning device 105.

Figure 4:
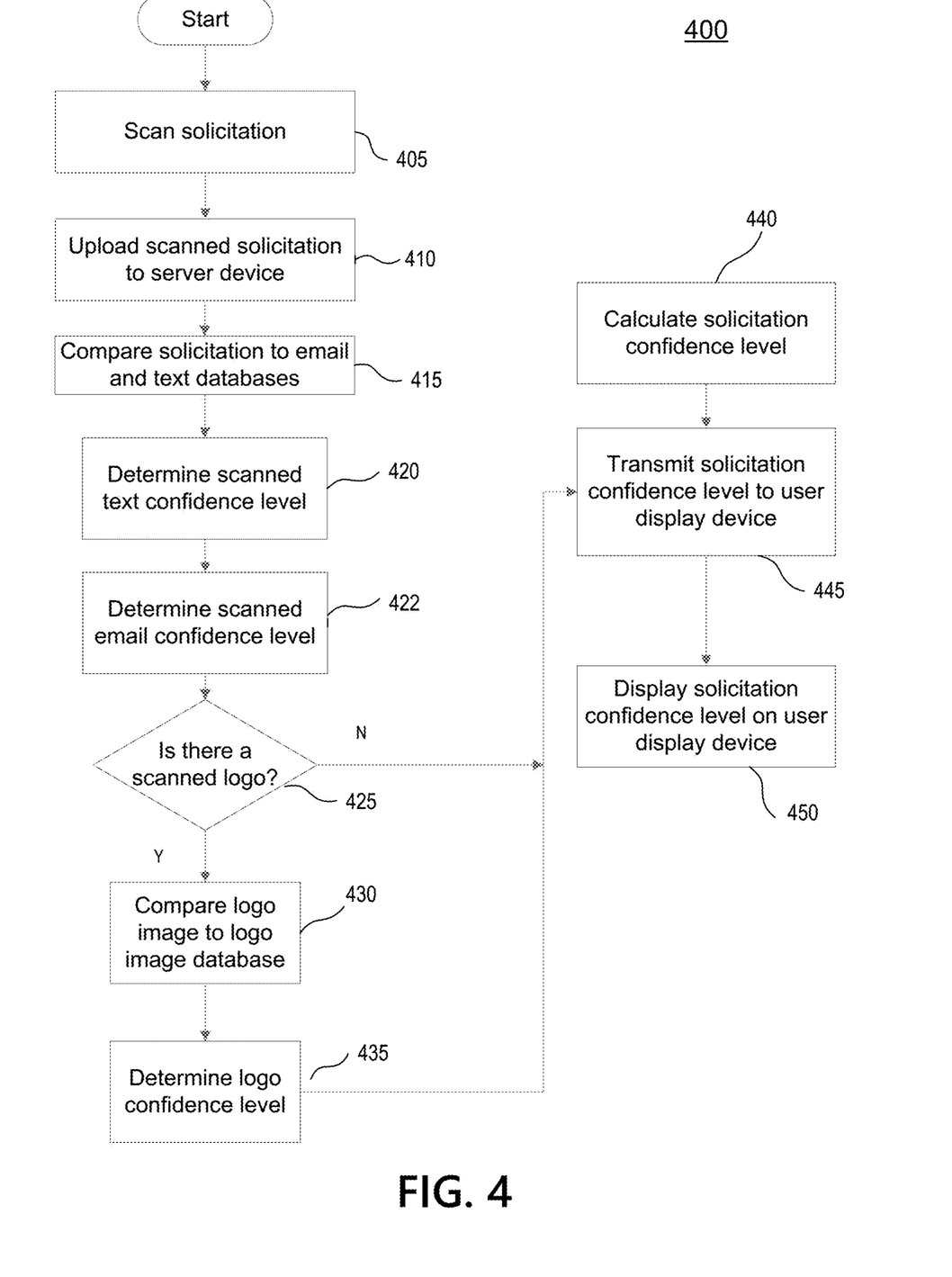
FIG. 4 depicts a flow diagram of another alternative example method in accordance with one or more illustrative aspects discussed herein.

An alternative method 400 of scanning a solicitation 128 is shown in FIG. 4. At step 405 of FIG. 4, a user scans a solicitation 128 with a scanning device 105. It is to be appreciated that in certain embodiments the solicitation may be electronic, such as an email. In embodiments where solicitation includes an email address, step 406 includes using OCR to scan the URL as well as the text. At step 410, the scanned solicitation 128 is uploaded to server device 101. At step 415, the scanned text is compared to text database 131 and the scanned email address is compared to email address database 137 of server device 101 with analytic software 129. At step 420, server device 101 determines a scanned text confidence level based on a likelihood that the scanned text is a legitimate solicitation, for either donations or information. At step 422, server device 101 determines a scanned email address confidence level based on a likelihood that the scanned email address is a legitimate known email address for a legitimate fundraising organization or other entity.

At step 425, it is determined if a logo image had been scanned in at step 405. If it is determined that a logo image had been scanned in at step 405, the logo image is compared to logo image database 133 of server device 101 using analytic software 129 at step 430. At step 435, server device 101 determines a logo confidence level based on a likelihood that the scanned logo image is a known legitimate logo for a fundraising organization or other entity.

At step 440, the server device calculates a solicitation confidence level with analytic software 129 based on the text confidence level, the email address confidence level, and the logo confidence level. It is to be appreciated that in certain embodiments, the text confidence level, the email address confidence level, and the logo confidence level can contribute equally to the solicitation confidence level. In other embodiments, the text confidence level, the email address confidence level, and the logo confidence level can each be weighted in order to determine the solicitation confidence level. It is to be appreciated that the text confidence level, the email address confidence level, and the logo confidence level can each be weighted at any desired ratio.

If it is determined at step 425 that a logo image had not been scanned in at step 405, the server device calculates the solicitation level at step 440 using only the text confidence level and the email address confidence level. At step 445, the confidence level is transmitted by server device 101 to the user's scanning device 105, and at step 450 the confidence level is displayed to the user on scanning device 105.

Figure 5:
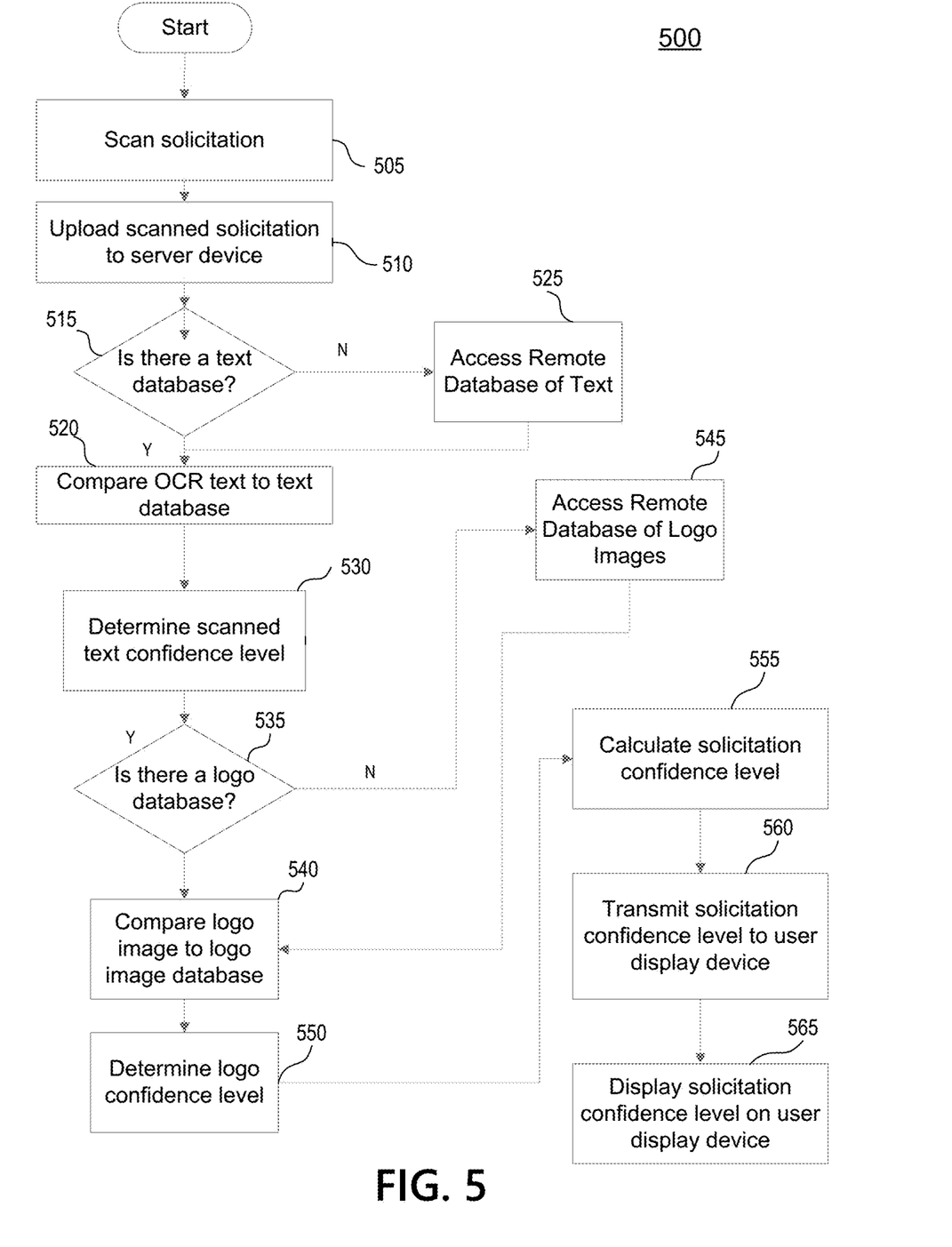
FIG. 5 depicts a flow diagram of a further alternative example method in accordance with one or more illustrative aspects discussed herein.

An alternative method 500 of scanning a solicitation 128 is shown in FIG. 5. At step 505 of FIG. 5, a user scans a solicitation 128 with a scanning device 105. Step 505 may include using OCR to scan text of solicitation 128, and the scanning of any logos present in solicitation 128. At step 510, the scanned solicitation 128 is uploaded to server device 101. At step 515, it is determined if there is a text database in server device 101. If it is determined at step 515 that there is a text database in server device 101, the scanned OCR text is compared to text database 131 of server device 101 using analytic software 129 at step 520. If it is determined at step 515 that there is not a text database in server device 101, server device 101 may access a remote database of text of known legitimate and known illegitimate phrases at step 525. To access the remote database server device 101 may communicate through network 103 with a device 132 of an external organization that maintains its own database of known legitimate and known fraudulent solicitations, and/or known legitimate and known fraudulent phrases used in solicitations. Exemplary external organizations that may maintain their own database of known legitimate and known fraudulent solicitations, and/or known legitimate and known fraudulent phrases used in solicitations include the Federal Trade Commission ("FTC"), Consumer Financial Protection Bureau, Internet Crime Complaint Center ("IC3"), the State Department, U.S. Postal Inspection Service, Federal Communications Commission, State Attorney General offices, and local police departments.

Then, at step 520, the scanned OCR text is compared to the remote database of text. At step 530, server device 101 determines a scanned text confidence level based on a likelihood that the scanned text is a legitimate solicitation, for either donations or information.

At step 535, it is determined if there is a logo image database in server device 101. If it is determined at step 535 that there is a logo image database in server device 101, the scanned logo image is compared to logo image database 133 of server device 101 using analytic software 129 at step 540. If it is determined at step 535 that there is not a logo image database in server device 101, server device may access remote logo images. In one embodiment, server device may access a remote database of logo images of known legitimate logos and known illegitimate logos at step 545. To access the remote database server device 101 may communicate through network 103 with a device 132 of an external organization that maintains its own database of known legitimate logos and known fraudulent logos. Exemplary external organizations that may maintain their own database of known legitimate logos and known legitimate logos include the Federal Trade Commission ("FTC"), Consumer Financial Protection Bureau, Internet Crime Complaint Center ("IC3"), the State Department, U.S. Postal Inspection Service, Federal Communications Commission, State Attorney General offices, and local police departments.

In other embodiments, at step 545, server device 101 could access a website of the entity soliciting funds or information from the user and select one or more logo images of the entity for comparison with the scanned logo in determining the logo confidence level. The logo images selected by server device 101 could be stored in a cache of logo images in memory 121 for a predetermined length of time. These cached images could then be searched when a scanned logo image is uploaded from a user's scanning device 105.

Then, at step 540, the scanned logo image is compared to the remote database of logo images. At step 550, server device 101 determines a logo confidence level based on a likelihood that the scanned logo image is a known legitimate logo for a fundraising organization or other entity.

At step 555, the server device calculates a solicitation confidence level with analytic software 129 based on the scanned text confidence level and the logo confidence level. It is to be appreciated that in certain embodiments, the scanned text confidence level and the logo confidence level can contribute equally to the solicitation confidence level. In other embodiments, the scanned text confidence level and the logo confidence level can each be weighted in order to determine the solicitation confidence level. It is to be appreciated that the scanned text confidence level and the logo confidence level can each be weighted at any desired ratio.

At step 555, the server device calculates the solicitation level based on the scanned text confidence level and the logo confidence level. At step 560, the confidence level is transmitted by server device 101 to the user's scanning device 105, and at step 565 the confidence level is displayed to the user on scanning device 105.

It is to be appreciated that crowdsourcing could benefit the users of this system. For example, when a user has received a solicitation, and the system generates a solicitation confidence level that shows there is a high likelihood that the solicitation is fraudulent, the user could broadcast this confidence level as a warning to other users to be on the lookout for the particular solicitation. In certain embodiments, the user could send a message through server device 101 to other user's scanning devices 105. In other embodiments, the user could broadcast the message individually to users of the system as well as the general public through social media.

In other embodiments, server device 101 could automatically send a message to all users when a solicitation confidence level is below a certain threshold for a particular solicitation, indicating a high likelihood that the solicitation is fraudulent. In other embodiments, server device 101 could automatically send a message when a solicitation confidence level is below a certain threshold for a particular solicitation to external organizations that track fraudulent solicitations, such as the Federal Trade Commission ("FTC"), Consumer Financial Protection Bureau, Internet Crime Complaint Center ("IC3"), the State Department, U.S. Postal Inspection Service, Federal Communications Commission, State Attorney General offices, and local police departments.

In certain embodiments, machine learning software 127 may include a machine learning model that can be utilized to improve the comparison and predictive capabilities of analytic software 129 in determining the confidence levels. Feedback from the users can help determine which solicitations were actually fraudulent and which were actually legitimate. Machine learning software 127 may apply clustering algorithms to the confidence levels in order to group confidence levels that are either legitimate or fraudulent. The users may be surveyed for feedback on the accuracy of the predicted confidence levels for the solicitations that they uploaded to the system. Based on the feedback from the users and other real world information, predicted confidence levels can be compared to actual results in order to determine whether solicitation text, logos, URLs, and or email addresses that were assigned high confidence levels were actually legitimate. Similarly, the predicted confidence levels can be compared to actual results in order to determine whether solicitation text, logos, URLs, and or email addresses that were assigned low confidence levels were actually fraudulent. Once patterns of performance have been calculated, the machine learning model can be updated. The self-optimizing action of the clustering techniques may enable machine learning processes to develop and train a model that can identify the patterns of failure and other patterns of performance.

Figure 6:
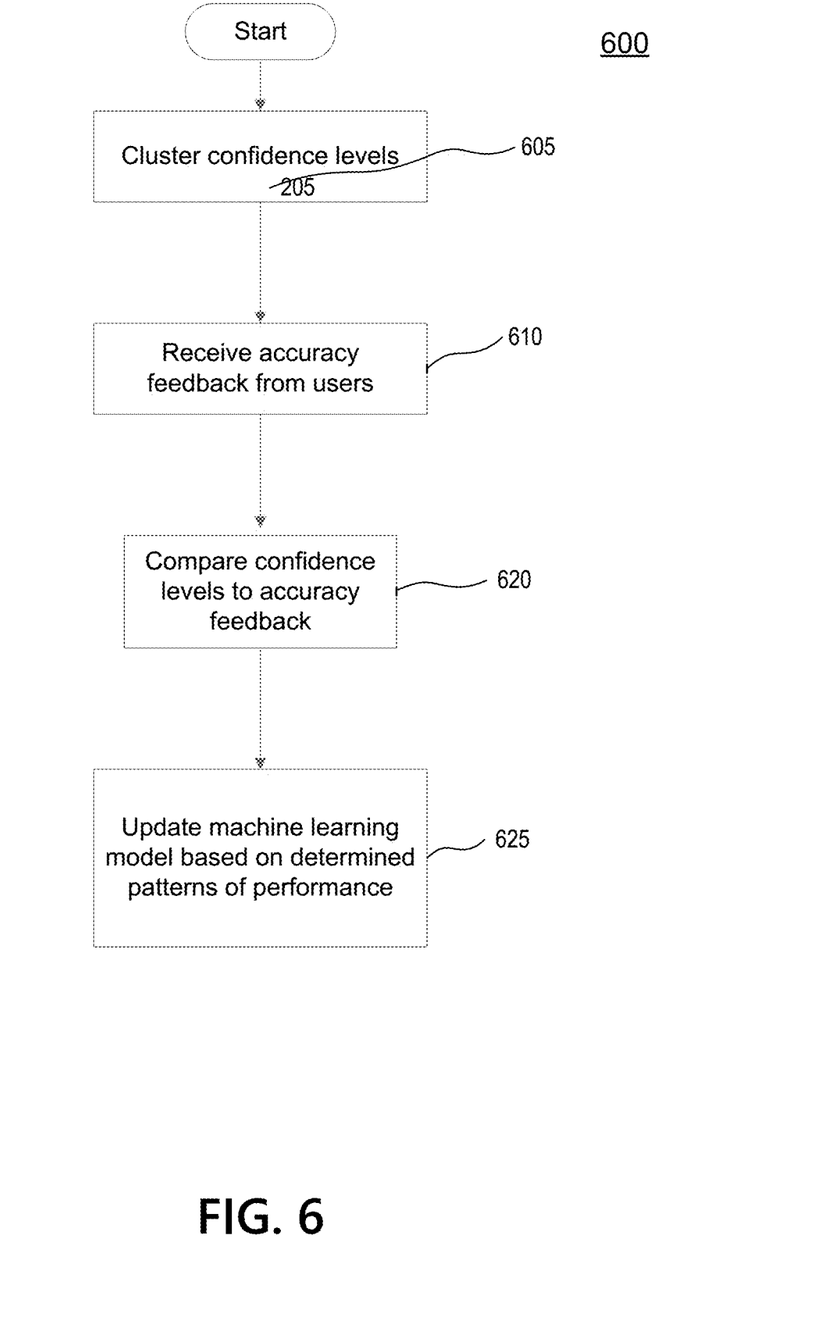
FIG. 6 depicts a flow diagram of yet another alternative example method in accordance with one or more illustrative aspects discussed herein.

A method 600 of applying machine learning software 127 is shown in FIG. 6. At step 605, text confidence levels, logo image confidence levels, URL confidence levels, and email address confidence levels are clustered according to the prediction of whether the particular solicitation item (text, logo image, URL, or email address) was predicted to be legitimate or fraudulent, and the degree to which is was predicted as either legitimate or fraudulent. At step 610, accuracy feedback is received from the users. At step 620 the predicted confidence levels are compared to the accuracy feedback to determine if high confidence levels of legitimacy correlate to actual legitimate solicitations, and if low confidence levels correlate to actual fraudulent solicitations, thereby determining patterns of performance At step 625, the machine learning model can be updated based on the determined patterns of performance.

By having solicitations that are either in printed or electronic form evaluated for the likelihood that they are legitimate or fraudulent, a user can have a confidence level regarding the legitimacy of a solicitation and help avoid donating money to a fraudulent person or entity, or providing personal information to the wrong person or entity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method comprising:
  receiving, from a user's scanning device, scanned OCR text and a scanned logo image from a document including a solicitation to donate to a fundraising entity;
  comparing, with a server device connected to the user's scanning device, the scanned OCR text to a database including legitimate solicitations for donations and fraudulent solicitations for donations;

determining a scanned text confidence level, with the server device, based on a likelihood that the scanned text is a legitimate solicitation for donations;
comparing, with the server device, the scanned logo to a known legitimate logo of the fundraising entity by:
    accessing, with the server device, a database of legitimate logos of fundraising entities
    selecting, with the server device, an image of a legitimate logo of the fundraising entity from the database;
    comparing, with the server device, the scanned logo to the legitimate logo; and
    updating the database of legitimate logos with legitimate logos received from databases external to the server device;
determining a logo confidence level, with the server device, based on a likelihood that the scanned logo is the known legitimate logo of the fundraising entity;
calculating, with the server device, a solicitation confidence level based on the scanned text confidence level and the logo confidence level;
transmitting, from the server device to the user's scanning device, the solicitation confidence level; and
displaying, on the user's scanning device, the solicitation confidence level.

2. The method of claim 1, wherein the step of comparing the scanned logo comprises:
accessing, with the server device, a website of the fundraising entity;
selecting, with the server device, an image of a website legitimate logo of the fundraising entity from the website; and
comparing, with the server device, the scanned logo to the website legitimate logo.

3. The method of claim 2, further comprising storing the website legitimate logo in a cache.

4. The method of claim 1, further comprising:
training a machine learning model based on a plurality of confidence levels, wherein the server device trains the machine learning model to:
    cluster confidence levels corresponding to each of the plurality of confidence levels into whether the solicitation was legitimate or fraudulent;
    determine one or more patterns of performance based on whether the solicitation is legitimate or fraudulent and whether the scanned logo is the legitimate logo of the fundraising entity based on whether the confidence level accurately predicted whether the solicitation was legitimate and whether the scanned logo was legitimate; and
    update the machine learning model based on the determined patterns of performance.

5. The method of claim 1, further comprising:
transmitting, from the user's device to other user's devices, a notification of a likely fraudulent solicitation scanned by the user's device.

6. The method of claim 1, wherein the document is an on-line document, and further comprising:
receiving, from the user's scanning device, a URL of the on-line document;
comparing, with the server device, the URL to a database including legitimate URL's for fundraising entities and fraudulent URL's for fundraising entities; and
evaluating, with the server device, a likelihood that the URL is from a legitimate fundraising entity to produce a URL confidence level.

7. The method of claim 1, wherein the document is an on-line document, and further comprising:
receiving, from the user's scanning device, an email address of the fundraising entity;
comparing, with the server device, the email address to a database including legitimate email addresses for fundraising entities and known fraudulent email addresses for fundraising entities; and
evaluating, with the server device, a likelihood that the email address is from a legitimate fundraising entity to produce an email confidence level.

8. A system comprising:
an optical head mounted display configured to:
    scan a document including a solicitation to donate to a fundraising entity, the scan including applying OCR to text in the document and capturing a logo image in the document; and
a server device connected to the optical head mounted display, the server device configured to:
    receive the scanned OCR text and captured logo from the optical head mounted display;
    access a text database of text from known fraudulent solicitation text phrases and legitimate solicitation text phrases;
    compare the scanned OCR text to the text from known fraudulent solicitation text phrases and legitimate solicitation text phrases;
    determine a text confidence level based on a likelihood that the scanned OCR text is a legitimate solicitation;
    access a logo database;
    compare the captured logo image to known legitimate fundraising entity logos from the logo database;
    determine a logo confidence level based on a likelihood that the captured logo image is a legitimate logo of the fundraising entity;
    access a database of legitimate logos of fundraising entities;
    select an image of a legitimate logo of the fundraising entity from the database;
    compare the captured logo to the legitimate logo;
    update the database of legitimate logos with legitimate logos received from databases external to the server device;
    produce a solicitation confidence level based on the text confidence level and the logo confidence level; and
    transmit, from the server device to the user's scanning device, the solicitation confidence level.

9. The system of claim 8, wherein the server device is further configured to:
access a website of the fundraising entity;
select an image of a legitimate logo of the fundraising entity from the website; and
compare the captured logo to the legitimate logo.

10. The system of claim 8, wherein the server device is further configured to:
train a machine learning model based on a plurality of confidence levels, wherein the server device trains the machine learning model to:
    cluster confidence levels corresponding to each of the plurality of confidence levels into whether the solicitation was legitimate or fraudulent;
    determine one or more patterns of performance based on whether the solicitation is legitimate or fraudulent and whether the captured logo is the legitimate logo of the fundraising entity based on whether the confidence level accurately predicted whether the solicitation was legitimate and whether the captured logo was legitimate; and update the machine learning model based on the determined patterns of performance.

11. The system of claim 8, wherein the server device is further configured to:

receive additional fraudulent solicitation text phrases and additional legitimate solicitation text phrases from an external entity; and update the database with the additional fraudulent solicitation text phrases and additional legitimate solicitation text phrases.

12. The system of claim 8, wherein the document is an on-line document, and wherein the server device is further configured to:

receive, from the user's scanning device, a URL of the on-line document;

compare the URL to a database including legitimate URL's for fundraising entities and fraudulent URL's for fundraising entities; and evaluate a likelihood that the URL is from a legitimate fundraising entity to produce a URL confidence level.

13. The system of claim 8, wherein the document is an on-line document, and wherein the server device is further configured to:

receive, from the user's scanning device, an email address of the fundraising entity;

compare the email address to a database including legitimate email addresses for fundraising entities and known fraudulent email addresses for fundraising entities; and evaluate a likelihood that the email address is from a legitimate fundraising entity to produce an email confidence level.

14. One or more non-transitory media storing instructions that, when executed by one or more processors, cause the one or more processors to perform steps comprising:

receiving, from a user's optical head mounted display, scanned data from a solicitation to donate to a fundraising entity, the data including scanned text, a logo image, a scanned URL, and a scanned email address;

comparing, with a server device, the scanned data to a database including legitimate solicitations for donations and fraudulent solicitations for donations, the database including known fraudulent solicitation text phrases, known legitimate solicitation text phrases, known legitimate logos of fundraising entities, known fraudulent logos of fundraising entities, known legitimate logos of fundraising entities, known fraudulent URLs of fundraising entities, known legitimate URLs of fundraising entities, known fraudulent email addresses of fundraising entities, and known legitimate email addresses of fundraising entities;

determining, with the server device, a text confidence level based on a likelihood that the scanned text is a legitimate solicitation for donations;

determining, with the server device, a logo confidence level based on a likelihood that the logo image is the known legitimate logo of a fundraising entity;

determining, with the server device, a URL confidence level based on a likelihood that the scanned URL is the known legitimate URL of a fundraising entity;

determining, with the server device, an email address confidence level based on a likelihood that the scanned email address is the known legitimate email address of a fundraising entity;

calculating, with the server device, a solicitation confidence level based on the text confidence level, the logo confidence level, the URL confidence level, and the email address confidence level;

transmitting, from the server device to the user's optical head mounted display, the solicitation confidence level;

obtaining, from the user's optical head mounted display, feedback to determine whether the solicitation confidence level accurately predicted whether the solicitation was legitimate; and training a machine learning model based on a plurality of confidence levels, wherein the instructions cause the server device to train the machine learning model by causing the server device to:

cluster confidence levels corresponding to each of the plurality of confidence levels into whether the solicitation was legitimate or fraudulent;

determine one or more patterns of performance based on whether the text is a legitimate or fraudulent solicitation, whether the logo image is the legitimate logo of the fundraising entity, whether the scanned URL is the legitimate logo of the fundraising entity, and whether the scanned email address is legitimate email address of the fundraising entity, based on whether the confidence level accurately predicted whether the scanned text was legitimate, whether the logo image was legitimate, whether the scanned URL was legitimate, and whether the scanned email address was legitimate; and update the machine learning model based on the determined patterns of performance.

15. The one or more non-transitory media of claim 14, further comprising:

requesting, by the server device, additional fraudulent solicitation text phrases, additional legitimate solicitation text phrases, additional known legitimate solicitation text phrases, additional known legitimate logos of fundraising entities, additional known fraudulent logos of fundraising entities, additional known legitimate logos of fundraising entities, additional known fraudulent URLs of fundraising entities, additional known legitimate URLs of fundraising entities, additional known fraudulent email addresses of fundraising entities, and additional known legitimate email addresses of fundraising entities from an external entity; and updating the database with the additional fraudulent solicitation text phrases, additional fraudulent solicitation text phrases, additional legitimate solicitation text phrases, additional known legitimate solicitation text phrases, additional known legitimate logos of fundraising entities, additional known fraudulent logos of fundraising entities, additional known legitimate logos of fundraising entities, additional known fraudulent URLs of fundraising entities, additional known legitimate URLs of fundraising entities, additional known fraudulent email addresses of fundraising entities, and additional known legitimate email addresses of fundraising entities.

16. The one or more non-transitory media of claim 14, further comprising:

transmitting, from the user's optical head mounted display to other user's optical head mounted display, a notification of a likely fraudulent solicitation scanned by the user's optical head mounted display.

* * * * *